United States Patent [19]

Brown et al.

[11] Patent Number: 5,725,648

[45] Date of Patent: Mar. 10, 1998

[54] PAPER COATINGS CONTAINING GUAR OR REDUCED MOLECULAR WEIGHT GUAR

[75] Inventors: Michael J. Brown, Newark; Teng-Shau Young, Wilmington, both of Del.

[73] Assignee: Hercules Incorporated, Wilmington, Del.

[21] Appl. No.: 719,375

[22] Filed: Sep. 25, 1996

[51] Int. Cl.$^6$ .............................. C09D 7/12; C09D 105/00
[52] U.S. Cl. ........................... 106/162.8; 106/205.01; 106/205.71; 524/42; 524/43; 524/44; 524/45; 524/46; 524/47; 524/55
[58] Field of Search ..................... 106/144.1, 162.8, 106/205.01, 205.71; 524/42–47, 55

[56] References Cited

U.S. PATENT DOCUMENTS

| | | | |
|---|---|---|---|
| 4,257,816 | 3/1981 | Yin et al. | 106/208 |
| 4,302,367 | 11/1981 | Cordes et al. | 260/17 |
| 5,080,717 | 1/1992 | Young | 106/197.1 |
| 5,096,490 | 3/1992 | Burdick | 106/171 |
| 5,362,312 | 11/1994 | Skaggs et al. | 106/189 |

OTHER PUBLICATIONS

G. Kloow, "Association Phenomena Between CMC and Non–Ionic Gums," Proceedings of (1987) No Month Avail TAPPI International Dissolving Pulps Conference, pp. 173–175.

T.S. Young and E. Fu, "Associative Behavior of Cellulosic Thickeners and Its Implications on Coating Structure and Rheology," TAPPI Journal, (Apr. 1991), pp. 197–207.

Primary Examiner—David Brunsman
Attorney, Agent, or Firm—Martin F. Sloan

[57] ABSTRACT

This invention relates to paper coating compositions comprising pigment, adhesive binder and rheology modifier wherein the rheology modifier comprises at least one of a) a mixture of guar and at least one other water-soluble polymer in sufficient amount to reduce the amount of guar adsorbed onto the pigment, or b) reduced molecular weight guar. The invention also relates to processes for making coated paper using the coating compositions, and to paper coated with the coating compositions.

29 Claims, No Drawings

5,725,648

PAPER COATINGS CONTAINING GUAR OR REDUCED MOLECULAR WEIGHT GUAR

FIELD OF THE INVENTION

This invention relates to water-soluble rheology modifiers for paper coating compositions.

BACKGROUND OF THE INVENTION

Many paper surfaces are coated with pigment-containing formulations to provide improved gloss, slickness, color, printability, print quality and brilliance. The applied coating serves to fill in the void areas on the paper surface. After drying and calendering, the coating provides a smooth even surface for printing. Paper coatings are applied as aqueous dispersions ranging in total solids from about 50% to more than 70%.

Coating ingredients fall into three categories: pigments, binder or adhesive and additives. Typically 80–90% of the dry weight of coatings is pigment. A variety of pigments is used: clay, calcium carbonate, titanium dioxide, barium sulfate, synthetic silicates and plastic pigments. The most commonly used pigments are china and kaolin clays.

Three types of coating binders are generally used, starches, protein and synthetics. Protein binders tend to be either casein, soya protein or animal glues. The synthetics, usually in the form of latexes, are mainly styrene/butadiene copolymers, acrylic polymers and copolymers, and vinyl acetate polymers and copolymers.

The rheology of the aqueous coating compositions needs to be controlled so that the coating can be easily pumped and perform suitably under the high shear conditions of the paper machine. For this reason, one of the most important classes of additives used in coatings is rheology modifiers. Rheology modifiers are water-soluble polymers, e.g. cellulose ethers, alginates, natural and modified starches, xanthan, as well as a variety of synthetic water-soluble polymers. Guar gram alone does not function acceptably as a rheology modifier in coating compositions, because it causes excessive pigment flocculation due to substantial adsorption of the guar onto the pigment. In spite of this shortcoming, paper coated with coatings containing guar-based rheology modifiers have high porosity and desirable ink and fountain solution reception properties in printing operations.

There is a need, therefore, for methods which will allow guar to be used as a rheology modifier in paper coatings that yield high quality coated paper with good printability.

U.S. Pat. No. 4,302,367 discloses paper coating compositions comprising binders such as poly(meth)acrylates, styrene/butadiene copolymers, vinyl esters, acrylamides, etc., in addition to thickeners such as polyvinyl alcohol, modified celluloses, starch, casein, alginates and high molecular weight carboxy-containing polymers. The use of guar or modified guar is not disclosed.

SUMMARY OF THE INVENTION

This invention relates to paper coating compositions comprising pigment, adhesive binder and rheology modifier wherein the rheology modifier comprises at least one of a) guar and at least one other water-soluble polymer in sufficient amount to reduce the adsorption of the guar onto the pigment, or b) reduced molecular weight guar. The invention also relates to paper coated with the coating compositions.

In another embodiment, the invention relates to a process for making coated paper comprising:

i) providing an aqueous paper coating composition comprising water, pigment, adhesive binder and rheology modifier comprising at least one of a) guar and at least one other water-soluble polymer, or b) reduced molecular weight guar;

ii) coating paper stock with the aqueous paper coating composition to obtain coated paper stock; and iii) drying the coated paper stock to obtain coated paper.

DETAILED DESCRIPTION OF THE INVENTION

The paper coatings of this invention contain rheology modifier that comprises at least one of a) guar and at least one other water-soluble polymer, or b) reduced molecular weight guar. When reduced molecular weight guar is used, it also may be used in combination with other water-soluble polymers.

Water-soluble polymers that may be used with guar or reduced molecular weight guar in preparing the paper coating compositions of this invention include polysaccharides and synthetic polymers. Examples of polysaccharides are cellulose ethers, alginates, natural and modified starches and xanthan. Preferred polysaccharides are alginates and cellulose ethers, examples of which are carboxymethyl cellulose, hydroxyethyl cellulose, hydroxypropyl cellulose, ethylhydroxyethyl cellulose, methyl cellulose and mixtures thereof. Carboxymethyl cellulose and alginate, preferably sodium alginate, are the most preferred polysaccharides.

In preparation of the paper coatings of this invention the maximum weight ratio of other water-soluble polymer to guar or reduced molecular weight polymer on a dry basis is about 4:1. The preferred maximum weight ratio is about 3:1, and the most preferred maximum weight ratio is about 2:1. The minimum weight ratio of other water-soluble polymer to guar on a dry basis is about 1:4. The preferred minimum weight ratio is about 1:3, and the most preferred minimum weight ratio is about 1:2.

Reduced molecular weight guar can be obtained for use in the paper coatings of this invention by treatment of guar with hydrogen peroxide in the presence of caustic. The viscosity of guar is about 100,000 cps or higher for a 3% solution at 25° C. For use in the invention the molecular weight is reduced to the point where the maximum Brookfield viscosity for a 2% aqueous solution is about 20,000 cps at 30 rpm. The minimum viscosity under the same conditions for use in the invention is about 25 cps. A preferred maximum Brookfield viscosity is about 1,500 cps, and a preferred minimum about 700 cps.

In addition to the rheology modifier, the paper coatings of this invention contain pigment and adhesive binder as major ingredients. Examples of pigments for use in the paper coatings are clay, calcium carbonate, titanium dioxide, barium sulfate, synthetic silicates and plastic pigments.

There are three classes of adhesive binders that are used in paper coatings generally, and that are suitable for this invention. The three classes are starches, protein and synthetics. Examples of protein binders are casein, soya protein and animal glues. The most useful synthetic adhesive binders are styrene/butadiene copolymers, acrylic polymers and copolymers, and vinyl acetate polymers and copolymers. Preferably the synthetics are utilized in the form of a latex. Suitable binders and binder latexes are further disclosed in U.S. Pat. No. 4,302,367, which is incorporated herein by reference in its entirety.

The ingredient levels in paper coating formulations are most commonly expressed as parts per 100 parts of pigment, because pigment is generally the ingredient present in largest amount. In the coatings of this invention, the amount of adhesive binder used may vary widely depending on the properties desired in the finished coated sheet. Preferably, the adhesive binder is present at a level of about 5 to about 25 parts per 100 parts of pigment on a dry basis.

The maximum level of guar or reduced molecular weight guar used as rheology modifier in the current invention is about 5 parts per 100 part of pigment on a dry basis. Preferably the maximum level is about 3 parts and more preferably about 1 part per 100 parts of pigment. The minimum level of guar or reduced molecular weight guar used as rheology modifier in the current invention is about 0.05 parts per 100 part of pigment on a dry basis. Preferably the minimum level is about 0.075 parts and more preferably about 0.1 part per 100 parts of pigment.

The components of the rheology modifier, i.e., reduced molecular weight guar or the combination of guar and other water-soluble polymer, may be added to the paper coating composition as dry solids, as aqueous solutions or as fluidized polymer suspensions. The preferred method for adding the rheology modifiers of this invention is as fluidized polymer suspensions in fatty acid, preferably fatty acids containing from 12 to 20 carbon atoms. When the combination of guar and other water-soluble polymer is utilized, they may be added separately to the other components of the paper coating, or they may be blended together before addition.

Processes for preparing fluidized polymer suspensions of water-soluble polymers in aqueous salt solutions are disclosed in U.S. Pat. No. 5,080,717 to Young, and processes for preparing fluidized polymer suspensions of water-soluble polymers in fatty acids are disclosed in U.S. Pat. No. 5,096,490 to Burdick. Both of these patents are incorporated herein by reference in their entireties.

In addition to pigment, adhesive binder and rheology modifier, the paper coatings of this invention may contain a variety of other ingredients such as, for example, lubricants such as glycols and fatty acids, insolubilizers, defoamers and dispersants.

In the aqueous paper coating compositions of this invention the pigment flocculation due to the presence of guar alone is reduced by reducing the molecular weight of the guar, or by blending guar with other water-soluble polymers. Pigment flocculation has been found to be proportional to the level of adsorption of rheology modifier onto the coating pigment. Consequently, the level of pigment flocculation can be predicted by the level of adsorption onto the pigment. Adsorption of rheology modifier onto pigment has been measured for 55% dispersions of kaolin clay containing 0.55 parts rheology modifier per 100 part of clay on a dry basis. Under these conditions it was found that 89% of guar was absorbed, while only 35–62% of reduced molecular weight guar was adsorbed. When guar was blended with carboxymethyl cellulose (two different viscosity grades), at weight ratios of from 1:2 to 2:1, 45–78% of the rheology modifier blend was adsorbed. Low viscosity carboxymethylcellulose was found to be more effective at reducing the total amount of rheology modifier adsorbed onto pigment than higher molecular weight material.

The paper coating compositions of this invention may be applied to paper and paper board by processes well known in the art. Many mechanical devices can be used for coating paper with the coatings of this invention, e.g., air knife coaters, brush coaters, cast coaters, flexible blade coaters, gravure coaters, knife coaters, reverse roll coaters and transfer roll coaters. After the coating step, the paper is dried and then usually calendared to obtain a smooth surface.

The quality and printability of the coated paper of this invention is improved over that of paper coated with paper coatings that are the same except that they contain only guar. Printability performance is strongly influenced by sheet porosity with higher porosities yielding better print performance. Paper coated with coatings containing guar/ carboxymethyl cellulose or guar/sodium alginate or reduced molecular weight guar as the rheology modifier have been found to have higher porosities than paper coated with coatings containing carboxymethyl cellulose or sodium alginate. Coatings made with guar alone give excessive pigment flocculation. The observed increases in coated sheet porosity when guar or reduced molecular weight guar is a component of the coating demonstrates how guar can be modified and used to enhance the functional properties of a paper coating. The presence of guar increases pigment adsorption and flocculation, effects which have been shown to increase coating structure. The result is a more porous coated structure. Coating porosity plays a major role in printability, because fountain solution and ink receptivity increase as porosity increases.

This invention is illustrated by the following examples, which are exemplary and not intended to be limiting. All percentages, parts, etc., are by weight unless otherwise indicated.

EXAMPLE 1

This example describes preparation of fluidized polymer suspensions of blends of guar gum and carboxymethyl cellulose in fatty acids.

Guar was Supercol® available from Hercules Incorporated, Wilmington, Del., 2% Brookfield solution viscosity >20,000 cps at 30 rpm. Three carboxymethyl cellulose samples were used, all available from Hercules Incorporated: CMC-A, 7H type, 2% solution viscosity >20,000 cps; CMC-B, 9M type, 2% solution viscosity 2,500 cps; CMC-C, 7L type, 2% solution viscosity 50 cps. Fatty acid was Pamak®4 tall oil fatty acids from Hercules Incorporated, Wilmington, Del. Nonionic surfactant was Triton®x-100, available from Union Carbide, Danbury, Conn., and anionic surfactant was Rhodafac®610-E, available from Rhone-Poulenc, Cranbury, N.J. Clay stabilizer was Claytone®AF, available from Southern Clay Products, Gonzales, Tex.

The fluidized polymer suspension samples were prepared by adding the dry guar and carboxymethyl cellulose precursors to the vigorously agitated fatty acid to which clay stabilizer, nonionic and anionic surfactants had been added. Mixing time was approximately 15–60 minutes. The resulting pH and suspension viscosity (Brookfield LVF viscometer at 30 rpm) were 6.5–7.0 and 2,500 cps for the compositions presented in Table 1.

TABLE 1

| Compositions in Weight % of Guar/Carboxymethyl Cellulose Fluidized Polymer Suspensions | | | | | | | | |
|---|---|---|---|---|---|---|---|---|
| Exp. 1A | Exp. 1B | Exp. 1C | Exp. 1D | Exp. 1E | Exp. 1F | Exp. 1G | Exp. 1H | Exp. 1I |

| | Exp. 1A | Exp. 1B | Exp. 1C | Exp. 1D | Exp. 1E | Exp. 1F | Exp. 1G | Exp. 1H | Exp. 1I |
|---|---|---|---|---|---|---|---|---|---|
| Fatty acid | 53 | 53 | 53 | 53 | 53 | 53 | 53 | 53 | 53 |
| Clay | 2 | 2 | 2 | 2 | 2 | 2 | 2 | 2 | 2 |

TABLE 1-continued

Compositions in Weight % of Guar/Carboxymethyl Cellulose Fluidized Polymer Suspensions

| | Exp. 1A | Exp. 1B | Exp. 1C | Exp. 1D | Exp. 1E | Exp. 1F | Exp. 1G | Exp. 1H | Exp. 1I |
|---|---|---|---|---|---|---|---|---|---|
| Guar | 21 | 14 | 28 | 21 | 14 | 28 | 21 | 14 | 28 |
| CMC-A | 21 | 28 | 14 | — | — | — | — | — | — |
| CMC-B | — | — | — | 21 | 28 | 14 | — | — | — |
| CMC-C | — | — | — | — | — | — | 21 | 28 | 14 |
| Nonionic surfactant | 2 | 2 | 2 | 2 | 2 | 2 | 2 | 2 | 2 |
| Anionic surfactant | 1 | 1 | 1 | 1 | 1 | 1 | 1 | 1 | 1 |

EXAMPLE 2

This example describes the procedure used for preparation of reduced molecular weight guar.

The preparation of reduced molecular weight guar materials involved (1) addition of alkaline aqueous peroxide solution to guar, (2) heating the resulting slurry to a temperature of 60° to 77° C., for a period of 20 minutes to 2 hours, (3) neutralization of the reaction mixture with an aqueous solution of acid, e.g., acetic acid, and (4) drying/grinding of the product. Sodium hydroxide was added to the peroxide solution prior to addition of the solution to the guar. Thus, the reaction mixtures typically comprised 100 parts of guar split, 0.3–24 parts 30% aqueous peroxide solution, 40–80 parts water and up to 20 parts caustic (25% active).

The reduced molecular weight guars obtained had a Brookfield viscosity of <20,000 cps at 30 rpm at a 2% aqueous solution. Reduced molecular weight guar (RMWG) samples in three different viscosity ranges, as shown below, were prepared for use in the following examples:

| RMWG-A | 4,000–6,000 cps |
|---|---|
| RMWG-B | 1,000–2,200 cps |
| RMWG-C | 200–400 cps. |

EXAMPLE 3

The example describes preparation of fluidized polymer suspensions of blends of reduced molecular weight guar (RMWG) and carboxymethyl cellulose. The process of preparation was the same as that described in Example 1. The reduced molecular weight guar was prepared as in Example 2. The pH and suspension viscosities were the same as those described in Example 1. The compositions are summarized in Table 2.

TABLE 2

Compositions in Weight % of Fluidized Polymer Suspensions Containing Reduced Molecular Weight Guar and Carboxymethyl Cellulose

| | Exp. 3A | Exp. 3B | Exp. 3C | Exp. 3D | Exp. 3E |
|---|---|---|---|---|---|
| Fatty acid | 53 | 53 | 53 | 53 | 53 |
| Clay | 2 | 2 | 2 | 2 | 2 |
| RMWG-B | 21 | 21 | 28 | 33 | 42 |
| CMC-A | 21 | — | 14 | 9 | — |

TABLE 2-continued

Compositions in Weight % of Fluidized Polymer Suspensions Containing Reduced Molecular Weight Guar and Carboxymethyl Cellulose

| | Exp. 3A | Exp. 3B | Exp. 3C | Exp. 3D | Exp. 3E |
|---|---|---|---|---|---|
| CMC-C | — | 21 | — | — | — |
| Nonionic surfactant | 2 | 2 | 2 | 2 | 2 |
| Anionic Surfactant | 1 | 1 | 1 | 1 | 1 |

EXAMPLE 4

This example describes the determination of the amount of adsorption onto Kaolin clay of guar, reduced molecular weight guar, carboxymethyl cellulose and carboxymethyl cellulose/guar mixtures in a standard aqueous clay suspension.

The procedure used for this determination is described by T. S. Young & E. Fu in *Tappi*, Apr. 1991, page 197. In the procedure a 55% aqueous suspension of kaolin clay containing a total of 0.3% water-soluble polymer based on total suspension weight was centrifuged. The liquid supernatant was filtered, and then a sample was analyzed by size exclusion chromatography to determine the amount of water-soluble polymer present. The difference between the starting amount and the amount found represents the amount adsorbed onto the clay. The water-soluble polymers used in this example are those described in Examples 1 and 2. The results are in Table 3.

TABLE 3

Adsorption of Water-soluble Polymers on Kaolin Clay

| Water-Soluble Polymer | Weight % Adsorption |
|---|---|
| Guar | 89 |
| RMWG-B | 62 |
| RMWG-C | 35 |
| CMC-A | 54 |
| CMC-B | 26 |
| Guar/CMC-A (⅔) | 78 |
| Guar/CMC-A (⅓) | 68 |
| Guar/CMC-A (½) | 62 |
| Guar/CMC-B (⅔) | 68 |
| Guar/CMC-B (⅓) | 55 |
| Guar/CMC-B (½) | 45 |
| RMWG-B/CMC-A (⅓) | 59 |

These data demonstrate that the adsorption of guar onto the clay can be controlled by blending with carboxymethyl cellulose or by reduction of the molecular weight of the guar.

EXAMPLE 5

In this example, data on coating structure and rheology of the coating formulations were determined.

A standard coating formulation from which the rheology modifier was omitted was prepared. The composition of the formulation was:

| Ingredient | Parts by Weight, Dry Basis |
|---|---|
| Clay | 100 |
| Adhesive binder | 13 |

| Ingredient | Parts by Weight, Dry Basis |
|---|---|
| Dispersant | 0.1 |
| Calcium stearate | 1.0 |
| Rheology modifier | as indicated |

Clay: No. 1 clay, J.M. Huber Corp., Macon, GA
Adhesive binder: Dow 620 styrene/butadiene latex, 50% solids, Dow Chemical, Midland, MI
Dispersant: Dispex N-40, Allied Colloids, Suffolk, VA
Calcium stearate: Calsan 65, PPG Industries The coating formulations were prepared by first adding water and dispersant to a metal container equipped with a high speed agitator. At moderate to high agitation speeds, the pigments were added to the water at approximately the 70% solids level. After the pigment was dispersed for about 45 minutes, the agitation was adjusted to slow speed, and the binder latex was added. The remaining ingredients (excluding rheology modifier) were added followed by mixing for about 15 minutes after adjustment to the final solids target, ca. 60%, by addition of water.

To vigorously stirred portions of the above master batch coating composition was then added sufficient rheology modifier to achieve a Brookfield viscosity target of 2,000 cps (#6 spindle, 100 rpm). The resulting formulations were mixed for about 15 minutes. Adsorption of rheology modifier by the coating solids was determined as in Example 4, and the rheological properties were determined using a Bohlin VOR Rheometer (Bohlin Rheologi, Lurid, Sweden). At a constant strain of 20%, the elastic modulus in Pa·sec was measured in a frequency range of 1–20 Hz. The results are in Table 4.

TABLE 4

Relationship Between Adsorption of Rheology Modifier and Coating Structure (Elastic Modulus)

| Rheology Modifier | Parts per 100 parts pigment | Wt. % Adsorbed | Elastic Modulus, G' (pa.sec) vs. frequency | |
|---|---|---|---|---|
| | | | 1 Hz | 2 Hz |
| CMC-B | 0.61 | 0 | 57.6 | 63.6 |
| Sodium alginate-A | 0.81 | 0 | 59.3 | 65.3 |
| Guar | 0.25 | 100 | 79.0 | 103.0 |
| 1:1 Guar/CMC-B | 0.33 | 44 | 79.9 | 101.0 |
| 1:1 Guar/sodium alginate-A | 0.35 | 15 | 71.0 | 94.0 |

These data indicate that when carboxymethyl cellulose or sodium alginate is added to guar, the adsorption onto the coating solids decreases from 100% in the case of guar to 44% and 15% respectively for 1:1 mixtures of guar with carboxymethyl cellulose or sodium alginate. By decreasing the amount of adsorption through addition of CMC or alginate to the guar, a usable guar-containing coating is obtained. Adsorption is also seen to be proportional to increased coating structure as measured by the elastic modulus of the coating formulation. The data reveal that higher adsorption and G' values are obtained when guar is present.

EXAMPLE 6

This example describes preparation of paper coated with the compositions of this invention and determination of sheet porosity, a property which strongly influences printability performance. Coatings were prepared by the method of Example 5. Coatings were then applied to an offset sheet with a basis weight of 74 kg per 1000 $m^2$ using a conventional drawdown technique with a Meir rod to achieve a coating weight of 13.29 kg/1000 $m^2$. after drying. The coated paper samples were then calendered with a Beloit Laboratory Calender at 268 kg/liner cm, 65° C., with one nip between two steel rolls.

Porosity measurements using a Parker Print-Surf unit manufactured by Testing Machines Inc., Amityville, N.Y. were performed on the coated paper samples with the results shown in Table 5. A coating composition containing only guar as a rheology modifier was prepared, but it was highly flocculated and unsuitable for coating.

TABLE 5

Effect of Rheology Modifier on Coated Sheet Porosity

| Rheology Modifier | Parts per 100 parts pigment | Sheet Porosity (ml/min) |
|---|---|---|
| CMC-B | 0.61 | 2.55 |
| Sodium alginate-A | 0.81 | 2.11 |
| 1:1 Guar/CMC-B | 0.33 | 3.11 |
| 1:1 Guar/sodium alginate-A | 0.35 | 2.88 |
| RMWG-B | 0.78 | 2.66 |
| 1:1 RMWG-B/sodium alginate-A | 0.68 | 2.66 |

The data in Table 5 show that the modification of guar with carboxymethyl cellulose or sodium alginate can modify finished sheet porosity. When guar was used with sodium alginate-A in a 1:1 ratio, the porosity increased 36%, from 2.11 to 2.88 ml/min. When the same guar was used 1:1 with CMC-B, porosity increased 22%, from 2.55 to 3.11 ml/min. When reduced molecular weight guar-B was used 1:1 with sodium alginate-A, porosity increased 26%, from 2.11 to 2.66 ml./min.

EXAMPLE 7

This example describes preparation of a coating formulations containing blends of guar and carboxymethyl cellulose and the testing of these formulations for viscosity properties and water retention when applied to unbleached kraft paper board.

The rheology modifiers used were those described in Example 1. For comparison, a coating utilizing a commercial fluidized polymer suspension containing primarily hydroxyethyl cellulose (Admiral®3089 fluidized polymer suspension, available from Hercules Incorporated, Wilmington, Del.) was also prepared and evaluated as a control.

The composition of the coating formulation was:

| Ingredient | Parts by Weight, Dry Basis |
|---|---|
| Clay | 100 |
| Adhesive binder | 18 |
| Rheology modifier | as indicated |

Clay: No. 2 clay, J.M. Huber Corp., Macon, GA
Adhesive binder: Reichhold 97966 styrene/butadiene latex, 50% solids, Reichhold Chemicals, Inc., Dover, DE
Solids: 61% before addition of rheology modifier The coating formulations were prepared by the procedure described in Example 5. Viscosities were of the coating formulations were determined both by the Brookfield method (#5 spindle, 100 rpm) and by a high shear method using a model ET 24-6 Hercules Hi-shear Viscometer, manufactured by Kaltec Scientific, Novi, Mich. The high shear viscosity data were generated at 2,200 and 4,400 rpm on the second pass using the E-bob.

Water retention data were obtained using a AA-GWR instrument manufactured by Kaltec Scientific, Novi, Mich. This static water retention test measures water loss in g/m² of a coating formulation through a 5 micron polycarbonate filter and into a standard piece of base stock, in this case unbleached kraft paper board. Time and pressure settings were 1 minute and 0.67 bars. The lower the value reported using this test, the higher the water retention. The results are in Table 6.

The rheology modifiers used were those described in Examples 1A and 3A. In addition a 1:1 blend of sodium alginate (2% Brookfield solution viscosity, 3,200 cps at 20 rpm, available from Kelco Products, San Diego, Calif.) and reduced molecular weight guar (prepared as in Example 2) was utilized as a dry blend. For comparison, a coating utilizing commercial fluidized polymer suspension Admiral®3089, fluidized polymer suspension (available from Hercules Incorporated, Wilmington, Del.) was also prepared and evaluated.

TABLE 6

Guar/Carboxymethyl Cellulose Rheology Modifiers in Coatings for Unbleached Kraft

| Rheology Modifier | Parts per 100 Parts Pigment | Brookfield Vis., cps | High Shear Vis., cps | | Water Loss, g/m² |
|---|---|---|---|---|---|
| | | | 2,200 rpm | 4,400 rpm | |
| Example 1B | 0.21 | 1,200 | 36 | 33 | 81 |
| Example 1A | 0.24 | 1,200 | 35 | 33 | 87 |
| Example 1C | 0.22 | 1,200 | 39 | 35 | 104 |
| Example 1E | 0.29 | 1,200 | 37 | 33 | 85 |
| Example 1D | 0.28 | 1,220 | 39 | 35 | 94 |
| Example 1F | 0.24 | 1,210 | 40 | 32 | 108 |
| Example 1H | 0.34 | 1,200 | 40 | 36 | 95 |
| Example 1G | 0.31 | 1,240 | 39 | 35 | 101 |
| Example 1I | 0.27 | 1,200 | 38 | 34 | 114 |
| Control | 0.35 | 1,250 | 43 | 37 | 98 |

Based on these results it appears that the composition of Example 1B is the most efficient thickener, needing only 40% of the quantity of the control required to reach the target viscosity value. The data on water retention reveal that the high levels of carboxymethyl cellulose in the compositions of Example 1B, 1E and 1H are responsible for yielding the highest water holding within each of the three carboxymethyl cellulose viscosity ranges tested as indicated by the lower water loss values. The composition of 1B was found to yield the highest water retention among the thickeners tested with a 17% improvement over the control.

The rheology of the coating compositions as illustrated by the high shear viscosities indicate comparable performance among the nine sample tested and significant improvements (lower values) over the control coating.

EXAMPLE 8

This example describes preparation of light weight coated rotogravure coating formulations containing blends of guar and carboxymethyl cellulose and blends of reduced molecular weight guar and sodium alginate, and the testing of these formulations for viscosity properties and water retention.

The composition of the coating formulation was:

| Ingredient | Parts by Weight, Dry Basis |
|---|---|
| Delaminated clay | 65 |
| No. 2 clay | 30 |
| Calcined clay | 5 |
| Adhesive binder | 6 |
| Calcium stearate | 1 |
| Dispersant | 0.1 |
| Rheology modifier | as indicated |

Clay: No. 2 clay, J.M. Huber Corp., Macon, GA
Delaminated clay: Hydraprint™, J.M. Huber Corp. Macon, GA
Adhesive binder: Genflo™ 5916 styrene/butadiene latex, 50% solids, GenCorp Products, Mogadore, OH
Solids level: 57%

Coatings were prepared and applied and testing was carried out as described in Example 7. The results are in Table 7.

TABLE 7

Rheology Modifiers in Lightweight Rotogravure Coatings Formulations

| Rheology Modifier | Parts per 100 Parts Pigment | Brookfield Vis., cps | High Shear Vis., cps | | Water Loss, g/m² |
|---|---|---|---|---|---|
| | | | 2,200 rpm | 4,400 rpm | |
| Example 1A | 0.23 | 1,100 | 39 | 35 | 177 |
| Example 3A | 0.30 | 1,110 | 39 | 36 | 137 |
| 1:1 alginate/ RMWG-B | 0.33 | 1,110 | 51 | 44 | 172 |
| Control | 0.37 | 1,100 | 49 | 42 | 182 |

All of the experimental coating formulations exhibited better thickening efficiency and better water retention than the hydroxyethyl cellulose containing comparison. The coating containing guar and carboxymethyl cellulose and the coating containing reduced molecular weight guar and carboxymethyl cellulose exhibited more favorable rheology than the control.

EXAMPLE 9

This example describes the use of rheology modifiers comprising guar and carboxymethyl cellulose in paper coating formulations for recycled 21 pt. board. Formulations containing protein and Admiral®3089, fluidized polymer suspension, a commercial rheology modifier in suspension form, were included for comparison. The rheology modifiers were those described in Example 1A-1I and Example 3B. The protein was Pro-Cote®200, available from Protein Technologies, St. Louis, Mo.

Both a base coat and a top coat were used in the trial. The base coat consisted of 100 parts pigment (77 parts No.1 clay, 11 parts ultra fine ground limestone, 12 parts titanium dioxide), 16 parts adhesive binder (poly vinyl acetate latex), 0.4 parts ammonium zirconium carbonate and the indicated amount of rheology modifier. Base coat solids were 50%. The Brookfield viscosity was 250 cps (#3 spindle/50 rpm). When protein was used as a comparison, the corresponding amount of latex binder was removed in order to retain comparable binding strength. The top coat consisted of 100 parts pigment (34 parts No.1 clay, 56 parts ultra fine ground limestone, 11 parts titanium dioxide), 19 parts adhesive binder (poly vinyl acetate latex), 0.2 parts ammonium zirconium carbonate and the indicated amount of rheology modifier. Solids for the top coat were 59%, and the Brookfield viscosity was 400 cps. As in the case of the base coat above, when protein was used as a comparison, the corresponding amount of latex binder was removed.

The coating trial was carried out on a cylindrical laboratory coater manufactured by Sensor & Simulation Products, Tacoma, Wash. The coater was run at a speed of 1000 ft./in. and coat weights of 2.5 and 3.0 lbs/1000 ft$^2$ on a dry basis were applied for the base and top coats respectively. The coated paperboard samples were calendered at 700 lb/linear inch at room temperature to 60 degree gloss. This required 12 nips between steel/steel rollers.

Results are summarized in Table 8. Smoothness measurements were carried out on a Print-Surf, (Testing Machines, Inc. Amityville, N.Y.) unit using a soft backing disk at 10 kg/cm$^2$ clamping pressure to generate smoothness values in microns. The lower the number, the smoother the surface.

TAPPI methods T452 and T480 respectively were used to measure brightness and gloss on the coated samples.

Ink receptivity was measured using the K&N method. Initial TAPPI brightness is first obtained. Then a standard K&N ink, supplied by K&N Laboratories, Countryside, Ill., is applied to the sample with a 10 mil drawn down bar. The ink is allowed to absorb for 2 minutes, at the end of which the ink is wiped off the sample. After 24 hours the final TAPPI brightness in the inked area is measured. The difference in brightness between the initial and final readings is reported as the K&N value. Higher K&N values correspond to greater ink receptivity.

TABLE 8

Evaluation of Paper Coating Rheology Modifiers in Paper Coatings

| Rheology Modifier | Parts per 100 Parts Pigment Base | Parts per 100 Parts Pigment Top | Brightness | Gloss | Smoothness (microns) | K & N Ink Receptivity |
|---|---|---|---|---|---|---|
| Example 1A | 0.38 | 0.07 | 79.6 | 51.2 | 1.7 | 9.4 |
| Example 1B | 0.27 | 0.06 | 80.5 | 52.4 | 1.8 | 7.4 |
| Example 1C | 0.27 | 0.05 | 80.5 | 51.9 | 1.8 | 9.7 |
| Example 1D | 0.46 | 0.08 | 78.9 | 53.6 | 1.7 | 6.6 |
| Example 1E | 0.38 | 0.08 | 79.3 | 52.4 | 1.8 | 8.7 |
| Example 1F | 0.31 | 0.07 | 80.2 | 55.7 | 1.8 | 10.6 |
| Example 1G | 0.51 | 0.07 | 79.4 | 53.9 | 1.7 | 7.4 |
| Example 1H | 0.49 | 0.10 | 80.6 | 53.6 | 1.8 | 9.3 |
| Example 1I | 0.35 | 0.06 | 80.0 | 55.3 | 1.8 | 7.5 |
| Example 3B | 0.28 | 0.05 | 79.0 | 55.0 | 1.7 | 8.8 |
| Protein control | 6.0 | 3.3 | 80.2 | 47.7 | 1.7 | 8.0 |
| Admiral ® 3089 control | 0.70 | 0.21 | 80.4 | 54.6 | 1.6 | 8.5 |

Thickening efficiencies for all ten guar/carboxymethyl cellulose mixtures were superior to that of hydroxyethyl cellulose. The board properties were similar for all of the experimental coatings and were comparable to those of the protein and Admiral®3089 controls, thus demonstrating the commercial runnability of the products of the invention.

It is not intended that the examples presented here should be construed to limit the invention, but rather they are submitted to illustrate some of the specific embodiments of the invention. Various modifications and variations of the present invention can be made without departing from the scope of the appended claims.

What is claimed is:

1. A paper coating composition comprising pigment, adhesive binder and rheology modifier wherein the rheology modifier comprises guar and at least one other water-soluble polymer selected from the group consisting of cellulose ethers, natural and modified starches, xanthan and mixtures thereof.

2. The paper coating composition of claim 1 wherein the adhesive binder is selected from the group consisting of starch, protein, synthetic polymer latexes and mixtures thereof.

3. The paper coating composition of claim 1 wherein the adhesive binder is a latex of synthetic polymer selected from the group consisting of styrene/butadiene copolymers, acrylic polymers, acrylic copolymers, vinyl acetate polymers and vinyl acetate copolymers.

4. The paper coating composition of claim 1 wherein the adhesive binder is a latex of styrene/butadiene copolymer.

5. The paper coating composition of claim 1 wherein the at least one other water-soluble polymer is cellulose ether.

6. The paper coating composition of claim 1 wherein the at least one other water-soluble polymer is cellulose ether selected from the group consisting of carboxymethyl cellulose, hydroxyethyl cellulose, hydroxypropyl cellulose, ethylhydroxyethyl cellulose, methyl cellulose and mixtures thereof.

7. The paper coating composition of claim 1 wherein the at least one other water-soluble polymer is carboxymethyl cellulose.

8. The paper coating composition of claim 1 wherein the level of guar in the paper coating composition is from about 0.05 to about 5 parts by weight per 100 parts of the pigment on a dry basis.

9. The paper coating composition of claim 1 wherein the level of guar in the paper coating composition is from about 0.075 to about 3 parts by weight per 100 parts of the pigment on a dry basis.

10. The paper coating composition of claim 1 wherein the level of guar in the paper coating composition is from about 0.1 to about 1 parts by weight per 100 parts of the pigment on a dry basis.

11. The paper coating composition of claim 1 wherein the weight ratio of other water-soluble polymer to guar on a dry basis is from about 1:4 to about 4:1.

12. The paper coating composition of claim 1 wherein the weight ratio of other water-soluble polymer to guar on a dry basis is from 1:3 to about 3:1.

13. The paper coating composition of claim 1 wherein the weight ratio of other water-soluble polymer to guar on a dry basis is from 1:2 to about 2:1.

14. The paper coating composition of claim 1 wherein the rheology modifier comprises guar and carboxymethyl cellulose, the adhesive binder is a styrene/butadiene copolymer latex and the pigment is clay, wherein the guar is present at a level of from about 0.05 to about 5 parts and the styrene/butadiene copolymer is present at a level of from about 5 to about 20 parts per 100 parts of pigment on a dry basis, and wherein the weight ratio on a dry basis of carboxymethyl cellulose to guar is from about 4:1 to about 1:4.

15. The paper coating composition of claim 1 wherein the adsorption of the rheology modifier onto the pigment is reduced to improve the quality and printability of the coated paper when compared to the same paper coating composition except that the rheology modifier contains guar but no other water-soluble polymer.

16. The paper coating composition of claim 1 wherein the at least one other water-soluble polymer is in sufficient amount to reduce the adsorption of the guar onto the pigment.

17. A paper coating composition comprising pigment, adhesive binder and rheology modifier comprising reduced molecular weight guar.

18. The paper coating composition of claim 17 wherein the reduced molecular weight guar has a Brookfield solution viscosity of from about 300 to about 20,000 cps at 30 rpm as a 2% solution in water.

19. The paper coating composition of claim 17 wherein the rheology modifier comprises reduced molecular weight guar with a Brookfield solution viscosity of from about 25 to about 20,000 cps at 30 rpm as a 2% solution in water, the adhesive binder is a styrene/butadiene copolymer latex and the pigment is clay, and wherein the reduced molecular weight guar is present at a level of from about 0.05 to about 5 parts and the styrene/butadiene copolymer is present at a level of from about 5 to about 20 parts per 100 parts of pigment on a dry basis.

20. The paper coating composition of claim 17 wherein the reduced molecular weight guar is prepared by hydrogen peroxide treatment of guar in the presence of alkali.

21. The paper coating composition of claim 17 wherein the adhesive binder is selected from the group consisting of starch, protein, synthetic polymer latexes and mixtures thereof.

22. The paper coating composition of claim 17 wherein the adhesive binder is a latex of a synthetic polymer selected from the group consisting of styrene/butadiene copolymers, acrylic polymers, acrylic copolymers, vinyl acetate polymers and vinyl acetate copolymers.

23. The paper coating composition of claim 17 wherein the adhesive binder is a latex of styrene/butadiene copolymer.

24. The paper coating composition of claim 17 wherein the level of reduced molecular weight guar in the paper coating composition is from about 0.05 to about 5 parts by weight per 100 parts of the pigment on a dry basis.

25. The paper coating composition of claim 17 wherein the level of reduced molecular weight guar in the paper coating composition is from about 0.075 to about 3 parts by weight per 100 parts of the pigment on a dry basis.

26. The paper coating composition of claim 17 wherein the level of reduced molecular weight guar in the paper coating composition is from about 0.1 to about 1 parts by weight per 100 parts of the pigment on a dry basis.

27. A paper coating composition comprising pigment, adhesive binder and rheology modifier wherein the rheology modifier comprises guar and at least one synthetic water-soluble polymer.

28. The paper coating composition of claim 27 wherein the synthetic water-soluble polymer is in sufficient amount to reduce the adsorption of the guar onto the pigment.

29. The paper coating composition of claim 27 wherein the synthetic water-soluble polymer is selected from the group consisting of polyacrylates, polyarethanes and urethane-modified polyacrylates.

* * * * *